Figure 1:
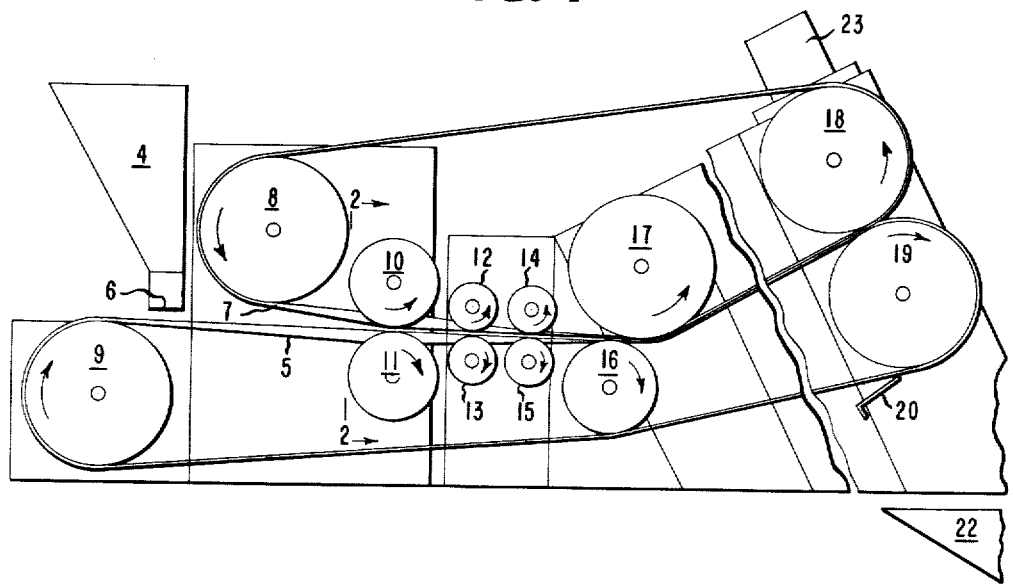

Sept. 24, 1963 R. C. RIBBANS III 3,104,608
POLYMER HANDLING
Filed June 20, 1960

INVENTOR
ROBERT CLARK RIBBANS III
BY Earl L. Tyner Jr.
ATTORNEY

United States Patent Office 3,104,608
Patented Sept. 24, 1963

3,104,608
POLYMER HANDLING
Robert Clark Ribbans III, Parkersburg, W. Va., assignor to E. I. du Pont de Nemours and Company, Wilmington, Del., a corporation of Delaware
Filed June 20, 1960, Ser. No. 37,238
1 Claim. (Cl. 100—152)

This invention relates to a technique for separating solids from mixtures of solids and liquids and more particularly to a method for removing water from an aqueous slurry of coagulated fluff of a hexafluoropropylene/tetrafluoroethylene interpolymer or copolymer.

Many methods are known in the art for solid-liquid separation, such as filtration, evaporation, etc., but considerable difficulty is encountered in handling of polymer slurries as those described herein due to the unique physical properties of the slurry.

In the production of a hexafluoropropylene/tetrafluoroethylene interpolymer or copolymer or perfluorocarbon polymer (hereinafter termed FEP resin), a dispersion of the polymer is coagulated to a wet fluff which is washed subsequent to the final drying step. The washed fluff contains about 250% by weight of water (dry basis) and must be partially dried before final heat treatment to prevent the latter step from being time consuming, costly and impractical from the standpoint of product contamination and degradation. The process of interim water removal presents the problem. The polymer at this stage consists of finely divided coagulated particles having air trapped in the coagulated masses, and for that reason, is somewhat thixotropic and extremely light weight. Thus, most of the obvious separation techniques are not satisfactory for this application. If filtration is attempted, the fines or polymer masses will blind the filter media, and filter aids impair the product purity. Common evaporation techniques may be used, but are quite expensive and do little to alleviate the undesirable effect of the fines which cause plugging of the separators in standard pneumatic conveying systems and driers. Attempts have been made to remove water by the use of a vibrating cascade conveyor, but the apparatus exhibited a low capacity, and because of the extreme lightness of the fluff, was unable to lower its water content effectively. Compression rolls were also tested in an attempt to improve the physical properties of the fluff while removing the water by compacting the fines into a more readily handled flake. The thixotropic nature of the fluff made it extremely difficult to force the material between the rolls, and the water which was present in the fines caused the rolls to become water bound under normal rolling conditions.

It is an object of this invention to provide a method for removal of liquid and air from thixotropic polymer fluff while compacting the fluff. Another object of this invention is to provide a technique for enhancing the physical properties of a fluff by compaction of the fluff to a nearly dust-free flake form which may be easily handled in subsequent processing steps. Still another object of this invention is to provide a device which will continuously remove water from an aqueous slurry of FEP resin while compacting the polymer from a mass of fines to flakes. Other objects will appear hereinafter.

The above objects are accomplished by providing a method for removing liquids from polymers which comprises confining a slurry-like mixture of the liquid and the polymer within a cavity formed between two substantially endless moving belts, reducing the space between the belts as they are advanced thereby squeezing out the bulk of the liquid initially mixed with the polymer without introducing excessive shear in the polymer and thereafter applying sufficient external force to each of said belts towards the polymer to compact the partially dried polymer and to effect a further reduction in the liquid content thereof, and finally separating the belts and removing the compacted polymer.

Figure 2:
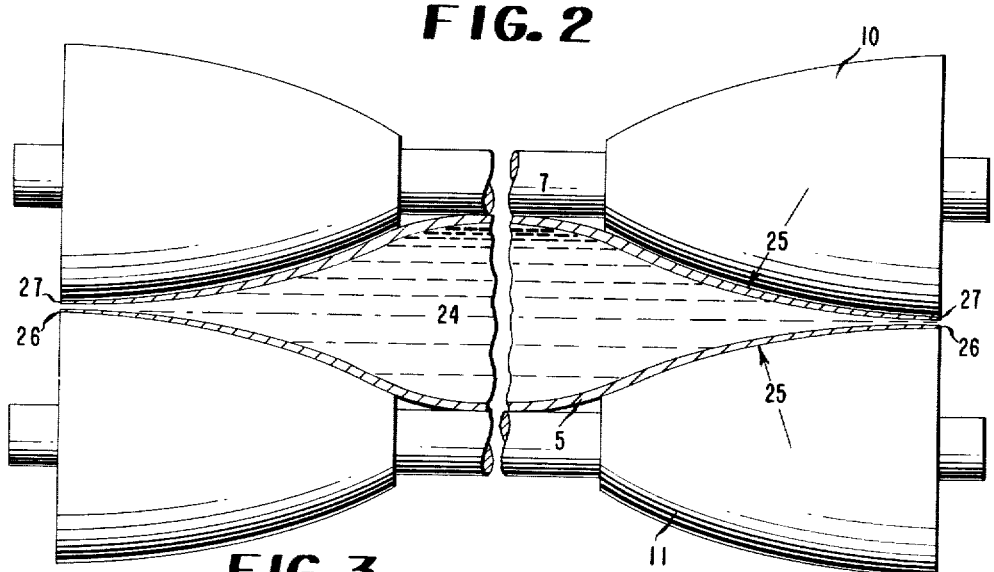

A more complete understanding may be had of the method and apparatus used to carry out this operation by referring to the drawing attached hereto and made a part of this specification in which FIGURE 1 is a side elevational view of the dewatering apparatus with a major portion of the frame removed for easier viewing, and FIGURE 2 is a cross-section taken along the line 2—2 of FIGURE 1.

With reference to FIGURE 1, the polymer slurry is retained in the feed hopper 4 and fed onto the lower belt 5 through opening 6 in the bottom of the hopper 4. The flow of slurry is controlled by moving the hopper in a direction perpendicular to the surface of belt 5. Shortly after the slurry is deposited on the lower belt 5 the upper belt 7 is directed over the slurry. The rear rolls 8 and 9 are standard cylindrical rolls and may be adjusted to obtain the desired tension on belts 5 and 7 respectively. A depression is formed in each of belts 5 and 7 by the shape of tapered rolls 10, 11, 12, 13, 14, 15, and 16. The general configuration of these rolls is shown in FIGURE 2. Rolls 10 and 11, in combination with belts 5 and 7, produce a cavity having a larger cross-sectional area than the succeeding rolls 12 and 13 which in turn produce a cavity of greater cross-sectional area than rolls 14 and 15. The decrease in cross-sectional area of the cavity imparts a gentle compression on the slurry and squeezes the major portion of the water out of the polymer and expels the water from between the cooperating edges of the belts 5 and 7 without causing the thixotropic material to flow out between the edges of the belts. The reduction in cross-sectional area can be expressed by the rate at which the opposing sides of the cavity formed by belts 5 and 7 approach each other as the cavity is gently compressed prior to exerting pressure on the belts in the high compression zone of the dewaterer. As a general rule, the distance between belts, as measured on a vertical line at the center of the belts, preferably should decrease at a rate of from 0.10–0.20 feet per second at belt speeds of about 2–30 feet per minute. The preferred rate of compaction may also be expressed by the relative angular disposition of the conveying belts i.e., from 1°–20° at the belt speeds mentioned hereinabove. By experiment, it was determined that, at belt speeds of 10 feet per second and at an angle between the belts of 4°, as defined hereinafter, satisfactory dewatering could be realized at a rate of 10–40 pounds per hour based on dewatered fluff using belts 9 inches in width.

Figure 3:
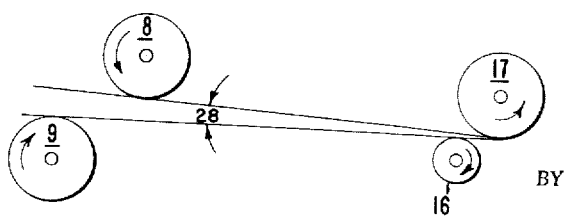

The angle between belts is shown as reference 28 on FIGURE 3 and is defined by the intersection of a center line perpendicular to the axis of rotation of rolls 8 and 16 and tangent to the surfaces of those rolls with the center line perpendicular to the axis of rotation of rolls 9 and 17 and tangent to the surfaces of those rolls. This arrangement permitted the walls of the cavity to converge at a rate of 0.14 feet per second measured as described above.

A large tapered roll 16 is provided to prevent a sudden compaction of the polymer before the material is placed under moderate compression by deflecting the belts under the roll 17. When the belts 5 and 7 and the polymer emerge from the moderate compression zone, defined as the distance travelled by the belts between rolls 10 and 11 and rolls 16 and 17, they are inclined upward at an angle of about 30° with the horizontal and directed between the compaction rolls 18 and 19 where pressures of 100 to 200 pounds per square inch over an area which is subtended by an angle of 12° are applied by a suitable device located on either or both of the rolls 18 and 19. For purposes of illustration in FIGURE 1, the upper roll 18 is forced towards the stationary roll 19 by a pneumatic cell 23. Since most of the water has been removed, the resulting polymer does not exhibit such pronounced thixotropic properties and may be compressed under high pressure. The tendency of the polymer to release water and air under high compression will not cause the rolls to be blocked with polymer since the belts pull the exuded materials through the rolls. As the rolls separate, the polymer tends to follow the lower belt 5. A doctor knife 20 is provided at the lower surface of the belt 5 to remove any material adhering to the belt. Any suitable means such as a vibrating roll may also be employed to remove the residual polymer. The compacted, dewatered polymer drops into a product chute 22 and thence to additional processing steps. All the rolls may be spring loaded, if desired, to provide for slight deviations in the speed of the belts or the variance in the amount of slurry being conveyed. Aligning pulleys may also be located along the edges of the belts. Suitable materials of construction of these nonpervious belts include, for example, latex-impregnated canvas, neoprene-impregnated canvas and nylon fabric with the nylon fabric being preferred.

FIGURE 2 shows a partial cross-section along the line 2—2 of FIGURE 1. The upper roll 10 is identical to the lower roll 11, although this identity is not necessary, and causes the belts 5 and 7 to bow inwardly to form the cavity 24 which contains the polymer slurry. The area of the cavity 24 may be decreased by two methods although a combination of these methods is preferred. The radius of the tapered portion of the rolls (indicated by the arrows 25) may be increased causing the belts to be deflected to a lesser extent from the horizontal plane thereby reducing the area of the cavity. This method along with a decrease in the outside diameter of the rolls is preferably employed to gently press the water out of the polymer and permits the water to pass between edges 26 and 27 of non-pervious belts 5 and 7 respectively. If porous belts are employed, some of the gas and liquid also passes through the belts.

Particular care should be exercised to prevent either air-borne or machine-induced contamination of the polymer. An enclosure for the apparatus may be used along with non-corroding materials of construction.

Using the technique of the instant invention, the water content of the FEP resin fluff may be reduced from 250% by weight on a dry basis to about 15% by weight with negligible loss of polymer. In addition, the initially fine material is compacted to an easily handled flake corresponding to an increase in bulk density (dry basis) of from 16 pounds per cubic foot to about 35 pounds per cubic foot. Although this technique has been described with respect to fluorocarbon resins it is equally applicable for the processing of slurries of many other polymers or resins particularly those in which the slurry exhibits thixotropic characteristics.

I claim:

An apparatus for removing fluids from mixtures of polymers and fluids which comprises a means for dispensing said mixture, a nonpervious upper belt and a nonpervious lower belt cooperating with said upper belt, a means for advancing said belts, and a plurality of rolls consisting of a set of cavity rolls, a set of compression rolls and a set of reversing rolls; each set of said rolls directing the movement of said belts; said lower belt positioned initially in a substantially horizontal position to receive said mixture from said dispensing means; said upper belt positioned above said lower belt to converge thereupon during travel; said set of cavity rolls consisting of a plurality of opposed pairs of upper and lower rolls, each upper roll of said pair located resspectively on the upper surface of the lower flight of said upper belt and each lower roll on the lower surface of the upper flight of said lower belt and formed with the outer portion of said cavity roll having a greater diameter than the central portion to force edges of said belts in a direction perpendicular to the direction of travel and towards their respective longitudinal centers during convergence and causing a cavity between said belts; each successive pair of cavity rolls in the direction of belt movement constructed to reduce the cross-sectional area of said cavity; said compression rolls being cylindrical in shape and arranged in opposed pairs with a roll of each pair of compression rolls being located on the upper surface of the lower flight of said upper belt and the other roll on the lower surface of the upper flight of said lower belt respectively and coupled with a means for forcing the rolls in each pair towards each other; said reversing rolls positioned before said dispensing means and after said compacting rolls in the direction of movement of said belts to substantially reverse the direction of travel of said belts; the relative angular dispositions of said belts while passing through said cavity rolls being at an angle of from 1°–20° at belt speeds of 2–30 feet per minute and a means for removing said polymer from between said belts after same have passed through said compacting rolls.

References Cited in the file of this patent

UNITED STATES PATENTS

| 205,758 | Noye | July 9, 1878 |
| 631,567 | Fowler | Aug. 22, 1899 |
| 1,350,788 | Day | Aug. 24, 1920 |
| 2,052,909 | Van Roggen et al. | Sept. 1, 1936 |
| 2,175,275 | Meyer | Oct. 10, 1939 |
| 2,263,343 | Thompson | Nov. 18, 1941 |
| 2,319,611 | Leathers | May 18, 1943 |

FOREIGN PATENTS

| 15,630 | Germany | Oct. 4, 1881 |

UNITED STATES PATENT OFFICE
CERTIFICATE OF CORRECTION

Patent No. 3,104,608

September 24, 1963

Robert Clark Ribbans III

It is hereby certified that error appears in the above numbered patent requiring correction and that the said Letters Patent should read as corrected below.

Column 2, line 50, for "feet per second" read -- feet per minute --.

Signed and sealed this 7th day of April 1964.

(SEAL)
Attest:
ERNEST W. SWIDER

Attesting Officer

EDWARD J. BRENNER

Commissioner of Patents